(12) United States Patent
Marchetto et al.

(10) Patent No.: US 9,782,929 B2
(45) Date of Patent: Oct. 10, 2017

(54) MOLDED PART WITH CLIP HOLDER, ASSEMBLY COMPRISING SUCH A PART, ASSOCIATED PRODUCTION METHOD

(71) Applicant: Faurecia Interieur Industrie, Nanterre (FR)

(72) Inventors: Gérald Marchetto, Saint Just (FR); Godefroy Beau, Colombes (FR); Jean-Jacques Pesce, Bresles (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/673,484

(22) Filed: Mar. 30, 2015

(65) Prior Publication Data
US 2015/0273759 A1  Oct. 1, 2015

(30) Foreign Application Priority Data

Mar. 31, 2014  (FR) ...................... 14 52841

(51) Int. Cl.
| | | |
|---|---|---|
| *B32B 3/06* | (2006.01) | |
| *B29C 65/70* | (2006.01) | |
| *B29C 45/16* | (2006.01) | |
| *B60R 13/02* | (2006.01) | |
| *F16B 21/08* | (2006.01) | |

(52) U.S. Cl.
CPC .......... *B29C 65/70* (2013.01); *B29C 45/1635* (2013.01); *B60R 13/0206* (2013.01); *F16B 21/088* (2013.01); *Y10T 428/24488* (2015.01); *Y10T 428/24612* (2015.01)

(58) Field of Classification Search
CPC .... F16B 5/0657; F16B 5/065; B60R 13/0206; Y10T 24/30; Y10T 24/309; Y10T 428/24182; Y10T 428/24174

USPC .......... 428/120, 119; 24/289, 297, 293–295; 52/718.01
See application file for complete search history.

(56) References Cited

U.S. PATENT DOCUMENTS

| | | | | |
|---|---|---|---|---|
| 7,600,809 | B2 * | 10/2009 | Boggess | B60R 13/0206 24/289 |
| 8,528,295 | B2 * | 9/2013 | Glynn | F16B 5/065 24/295 |
| 2005/0054229 | A1 * | 3/2005 | Tsuya | B60R 13/0206 439/280 |
| 2010/0088860 | A1 * | 4/2010 | Benedetti | F16B 5/065 24/297 |
| 2012/0212923 | A1 | 8/2012 | Peng et al. | |

FOREIGN PATENT DOCUMENTS

| | | |
|---|---|---|
| EP | 2175146 A2 | 4/2010 |
| FR | 2859510 A1 | 3/2005 |

OTHER PUBLICATIONS

French Search Report for priority document No. FR 1452841, dated Feb. 4, 2015, 3 pages.
French Written Opinion for priority document No. FR 1452841, dated Feb. 4, 2015, 3 pages.

* cited by examiner

*Primary Examiner* — Alexander Thomas
(74) *Attorney, Agent, or Firm* — Reising Ethington P.C.

(57) ABSTRACT

A molded vehicle part having at least one clip holder comprising a core designed to receive a clip. The core has a single first stiffening element, protruding from its first large face, and a single second stiffening means, protruding from the second large face.

15 Claims, 2 Drawing Sheets

MOLDED PART WITH CLIP HOLDER, ASSEMBLY COMPRISING SUCH A PART, ASSOCIATED PRODUCTION METHOD

TECHNICAL FIELD

The invention relates to a molded vehicle part of the type comprising a clip holder having a core designed to receive a clip, the core extending in a substantially longitudinal and transverse plane and having first and second large faces opposite one another, the core being transversely delimited by first and second lateral edges.

BACKGROUND OF THE INVENTION

It is possible to provide that the clip holder, considered in cross-section perpendicular to the longitudinal direction, has an H-shaped section.

When the main portion of the part is planar, the stripping direction of the part corresponds substantially to the longitudinal direction. However, the clip holder may be formed on a bowed zone of the main portion. In that case, the stripping direction of the part forms an angle with the longitudinal direction. When the clip holder has an H-shaped cross-section, the wings of the H form undercuts that make stripping difficult.

One solution is then to provide two drawers in the mold, which move perpendicular to the core of the clip holder, in opposite directions.

The installation of these two drawers in the mold greatly complicates the design of the mold, since the guide means for the two drawers interfere.

SUMMARY OF THE INVENTION

In this context, an object of the invention is to provide a molded part that does not have the above drawback.

To that end, the invention pertains to a molded vehicle part of the aforementioned type, characterized in that the core has a single first stiffening element, protruding from its first large face, and a single second stiffening element, protruding from its second large face.

Even when the main portion of the molded part is curved, it is possible to strip that part using a single drawer in the mold.

The drawer moves in a transverse general direction. This direction has a small incline relative to the plane in which the core fits. Such a movement is possible because the first large face and the second large face are only delimited by stiffening elements along a single lateral edge, and do not have tall raised portions.

When the clip holder has an H-shaped cross section, the first and second large faces of the core are each delimited along the first and second lateral edges by stiffening elements. It is therefore not possible to provide for a drawer having a transverse movement.

The installation of a single drawer in the mold does not pose any particular technical problems, and does not cause interferences with other elements of the mold.

The molded part may also have one or more of the features below, considered individually or according to any technically possible combinations:

the first stiffening element and the second stiffening element extend in parallel planes separate from one another;

the first stiffening element and the second stiffening element extend along the first lateral edge and the second lateral edge, respectively;

the core has at least one window;

the window opens at the second lateral edge;

the clip holder comprises a rib along the second lateral edge, extending at least along the window;

the clip holder comprises at least one case with an upper wall and a plurality of side walls connecting the upper wall to the free surface, at least the core being directly connected to the upper wall;

the clip holder comprises at least one case with an upper wall and a plurality of side walls connecting the upper wall to the free surface, the core, the first stiffening element and the second stiffening element being directly connected to the upper wall; and the core, the first stiffening element and the second stiffening element are directly connected to the free surface.

Furthermore, the first stiffening element and the second stiffening element advantageously together have an S-shaped cross-section perpendicular to the longitudinal direction.

According to a second aspect, the invention relates to an assembly comprising a molded part having at least some of the above features, and at least one elastic clip mounted on the core.

The assembly may also have one or more of the features below, considered individually or according to any technically possible combinations:

the elastic clip comprises a portion arranged to snap into a complementary member supported by another part of the motor vehicle;

the clip is independent of the other part;

the clip is a bent metal part or is made from molded plastics;

the clip pinches a zone of the core furthest from the free surface; and the clip is a flexible blade, comprising a connecting part pinching the core of the clip holder and a part designed to snap into a complementary member supported by another part of the motor vehicle.

According to a third aspect, the invention relates to a method for manufacturing a molded part having at least some of the above features, the method comprising the following steps:

obtaining a mold having a cavity and a single drawer movable relative to the cavity;

inserting plastic material into the mold, the drawer being in a first position; and moving the drawer relative to the cavity into a second position, in a direction forming an angle smaller than 15° relative to the transverse direction.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION OF ILLUSTRATED EMBODIMENTS

Figure 1:
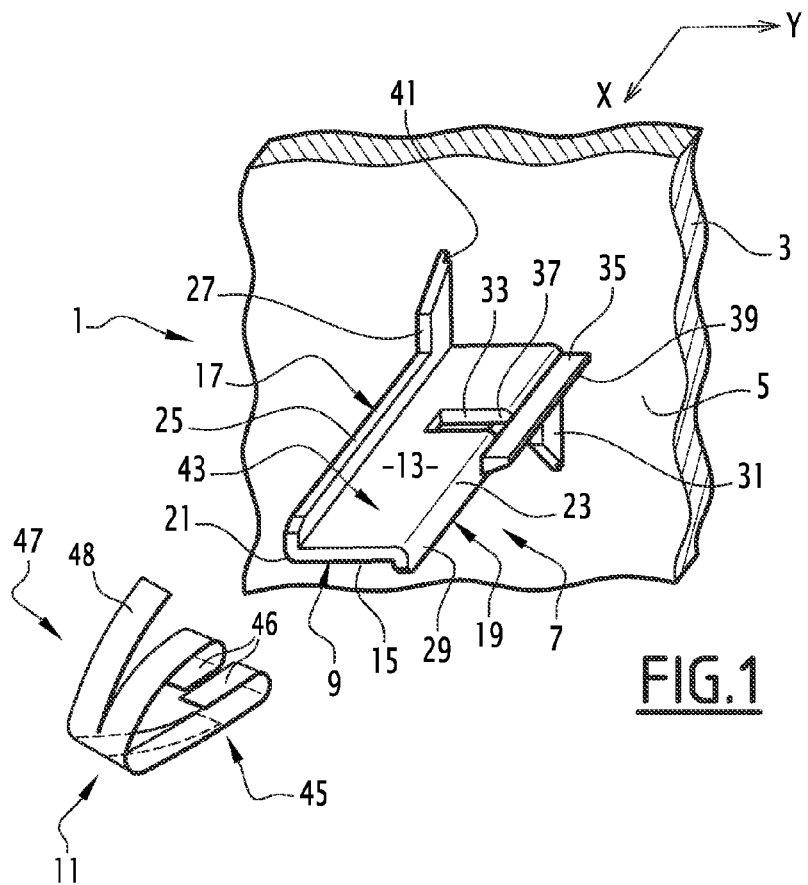
FIG. 1 is a perspective view of a portion of a molded part according to the invention, with an elastic clip designed to be mounted on the clip holder.

The part 1 partially shown in FIG. 1 is designed to be installed onboard a vehicle, typically a motor vehicle such as a car or truck. For example, this part is a trim part or accessory designed to be fastened in the passenger compartment of the vehicle.

The part 1 is obtained by molding, typically by injection into a mold.

The part 1 is typically made from plastic. Alternatively, it is made from any other appropriate material.

The part 1 comprises, as shown in FIG. 1, a main portion 3 having a free surface 5, and at least one clip holder 7 protruding longitudinally from the free surface 5.

The free surface is for example planar. Alternatively, it may be partially or completely curved.

The part generally comprises several clip holders, thus making it possible to clip the part in several locations. However, the part may comprise only one clip holder.

The clip holder 7 comprises:
- a core 9 designed to receive the clip 11, the core 9 extending in a substantially longitudinal and transverse plane and having first and second large faces 13 and 15 opposite one another;
- a first stiffening element 17, protruding from the first large face 13 of the core moving away from the latter; and
- a second stiffening element 19, protruding from the first second face 15 of the core moving away from the latter;

More specifically and as shown in the figures, the stiffening elements 17, 19 extend protruding from each large face 13, 15, respectively, moving away from each large face 13, 15, respectively. Each stiffening element is visible with the large face to which it attaches. The first stiffening element 17 is visible with the large face 13. The second stiffening element 19 is visible with the large face 15.

The longitudinal direction is substantially perpendicular to the zone of the free surface 5 supporting the clip holder 7. It is symbolized by arrow X in FIG. 1. The transverse direction is perpendicular to the longitudinal direction. It is symbolized by arrow Y in FIG. 1.

The core 9 is transversely delimited by first and second lateral edges 21, 23.

In the illustrated example, the core 9 has a rectangular shape. The first and second lateral edges 21, 23 both extend longitudinally. They are parallel to one another.

Alternatively, the core may have other shapes, for example a trapezoidal shape. In that case, the first and second edges 21, 23 are not parallel to one another and are not necessarily longitudinal.

The first stiffening element 17 extends along the first lateral edge 21. The second stiffening element 19 extends along the second lateral edge 23.

In the illustrated example, the first and second stiffening elements 17, 19 exactly follow the first lateral edge 21 and the second lateral edge 23, respectively. Alternatively, the first and second stiffening elements 17, 19 are slightly spaced from the first and second lateral edges 19, 21, over all or part of their length.

The first stiffening element 17 is a rib. It extends over the entire length of the first lateral edge 21. Alternatively, it only extends over a fraction of the length of the first lateral edge 21.

The first stiffening element 17 comprises a main portion 25 with a first height, extended by an end portion 27 having a second height greater than the first. The end portion 27 is directly connected to the free surface 5. The main portion 25 extends over the majority of the longitudinal length of the lateral edge 21.

The second stiffening element 19 for example has substantially the same shape as the first stiffening element 17. It comprises a main portion 29 with a first height, extended by an end portion 31 having a second height greater than the first. The end portion 31 is directly connected to the free surface 5.

Alternatively, the first and second stiffening elements have different shapes. For example, they have the same height over their entire longitudinal length, or any other appropriate shape.

In the illustrated example, the first and second stiffening elements 17 and 19 extend in respective planes perpendicular to the core 9. They extend in parallel planes separate from one another. Each large face 13 and 15 only comprises a single stiffening element. The first and second stiffening elements 17 and 19 extend in opposite directions.

Alternatively, the first stiffening element 17 and/or the second stiffening element 19 extends in a plane that is not perpendicular to the core 9. For example, this claim forms an angle comprised between 70° and 110° relative to the core 9.

The first large face 13 does not bear any raised portion protruding between the first stiffening element 17 and the second lateral edge 23. Likewise, the second large face 15 does not bear any raised portion protruding between the second stiffening element 19 and the first lateral edge 21.

In the illustrated example, the first large face 13 and the second large face 15 do not bear any raised portions, and are completely planar. Alternatively, the first large face 13 and/or the second large face 15 bear one or more short raised portions. Thus, considered in the longitudinal direction as in FIG. 2, the clip holder is generally S-shaped.

More specifically, the core 9 and the first and second stiffening elements 17, 19 considered in cross-section in a plane perpendicular to the longitudinal direction are generally S- or chair-shaped.

The core 9 typically has at least one window 33. The window 33 is designed to allow fastening of the clip 11.

In the illustrated example, the core has a single window. Alternatively, the core has several windows.

The or each window 33 is a through window, i.e., is cut through the entire thickness of the core 9.

In the illustrated example, the window 33 opens at the second lateral edge 23.

In order to stiffen the clip holder 7 along the second lateral edge 23, the holder 7 comprises a rib 35 along the second lateral edge, extending at least along the window 33. The rib 35 is supported by the second stiffening element 19. It extends slightly below the second lateral edge 23, i.e., slightly below the first large face 13.

As shown in FIG. 1, the window 33 emerges through an opening 37 arranged in the second lateral edge 23. The opening 37 is not closed off, or practically not closed off, by the rib 35.

In the illustrated example, the rib 35 extends over approximately half of the longitudinal length of the second lateral edge 23. It extends from the free surface 5, substantially to the middle of the second lateral edge 23. It is directly connected to the free surface 5. Considered in cross-section perpendicular to the longitudinal section, it has a substantially trapezoidal shape, and narrows from the second stiffening element 19 to a free longitudinal edge 39.

In the example embodiment of FIG. 1, the core 9, the first stiffening element 17 and the second stiffening element 19 are directly connected to the free surface 5. They are connected by their respective edges.

The core 9, the first stiffening element 17 and the second stiffening element 19 are thin parts, having substantially the same thickness, that thickness being consistent substantially everywhere.

However, as shown in FIG. 1, the core 9, the first stiffening element 17 and the second stiffening element 19 have a thinner material line at the junction with the free surface 5. In other words, the clip holder 7 is connected to the free surface 5 by a line along which the material thickness is reduced, the line being designated by reference 41 in the figure.

This line 41 makes it possible to trap any bubbles.

As indicated above, the holder 7 is provided to receive an elastic clip 11, like that shown in FIG. 1. The clip is typically a flexible blade, for example a part made from bent metal or molded plastic.

The clip 11 is normally mounted on the core 9. More specifically, it is mounted on the zone 43 of the core 9 furthest from the free surface 5. It typically pinches the zone 43, part of the clip bearing against the first large face 13 and another part of the clip bearing against the second large face 15.

Typically, the clip 11 comprises a connecting portion 45 pinching the core 9. More specifically, the portion 45 is designed to cooperate with the window 33 in order to fasten the clip 11 to the clip holder 7. In the illustrated example, the portion 45 comprises two arms, the ends 46 of which are bent in a U shape, said ends 46 falling into the window 33 when the clip 11 is mounted on the clip holder 7.

The clip 11 comprises still another portion 47 designed to snap into a complementary member supported by another part of the motor vehicle. Thus, the molded part 1 and the other part of the vehicle are rigidly fastened to one another using the clip 11 and the clip holder 7. In the example shown in FIG. 1, the portion 47 comprises two elastic arms 48. Elastic clips 11 of this type are known, for example from FR 2,865,248. The clip 11 will therefore not be described in more detail here.

Figure 2:
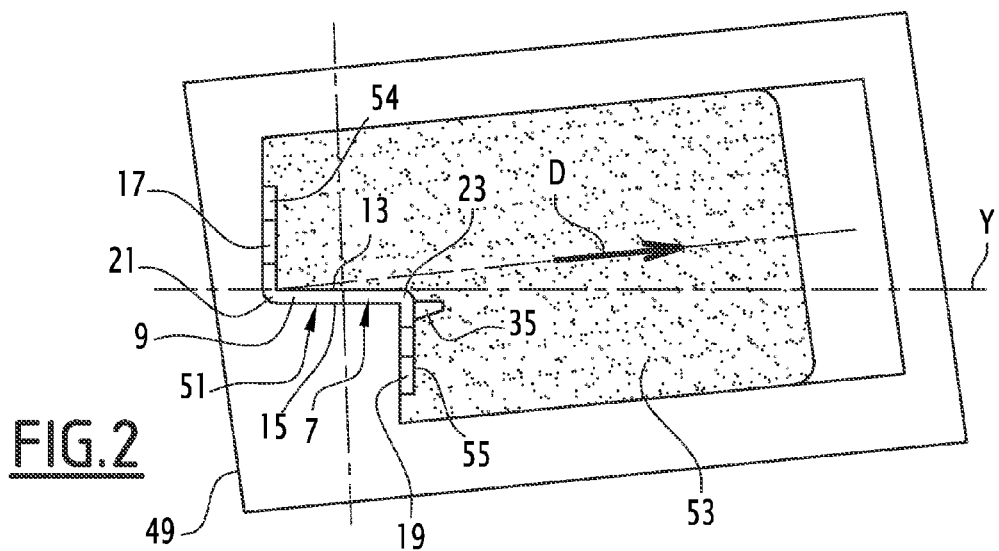
FIG. 2 is a diagrammatic illustration of the molded part of FIG. 1 and the corresponding mold, both considered in the longitudinal direction.

The method for manufacturing the molded part 1 will now be outlined, in reference to FIG. 2.

The method comprises the following steps:
obtaining a mold 49, having a cavity 51 and a single drawer 53, movable relative to the cavity 51;
inserting a plastic material into the cavity 51, the drawer 53 being in a first position illustrated in FIG. 2;
moving the drawer 53 relative to the cavity 51 into a second position, in a direction D forming an angle smaller than 15° relative to the transverse direction.

In FIG. 2, only half of the mold is shown. The other half of mold is not visible. The final stripping of the part 1 is done by separating the two portions of the mold from one another, in a substantially longitudinal stripping direction. This stripping direction is substantially perpendicular to the plane of the sheet in the illustration of FIG. 2.

In the first position, the drawer 53 delimits, with the mold 49, a cavity in the shape of the molded part 1, and in particular defining the shape of the clip holder 7. In the second position, the drawer 53 is moved away from the clip holder 7 and allows movement of the two mold portions relative to one another in the stripping direction. This is not possible when the drawer 53 is in its first position, due to the interference between the drawer 53 and the edge of the window 33.

As shown in FIG. 2, the direction D forms an angle smaller than 15° relative to a plane in which the core 9 fits. Typically, the direction D forms an angle with the transverse direction comprised between 3° and 15°, preferably comprised between 5° and 10°, and for example equal to 7°. This angle makes it possible to remove the drawer 53 from the window 33 through the opening 37.

In the first position, the drawer 53 delimits the first large face 13 of the core, the face 54 of the first stiffening element 17 turned, in the transverse direction, toward the second stiffening element 19, and the face 55 of the second stiffening element 19 turned, in the transverse direction, opposite the first stiffening element.

The direction D is oriented to separate the drawer from the large face 13 and is separated from the faces 54 and 55.

A first alternative embodiment of the molded part will now be described, in reference to FIG. 3. Only the differences between this alternative and FIG. 1 will be outlined below. Elements that are identical or perform the same functions will be designated using the same references in the alternative embodiments of FIGS. 1 and 3.

In this alternative embodiment, the core 9 and the second stiffening element 19 are not directly connected to the free surface 5.

However, the clip holder 7 comprises a case 56 having an upper wall 57 and a plurality of side walls 59 connecting the upper wall 57 to the free surface 5. The case 56 is hollow. It is open on at least one face, so as to allow the drawer to extricate itself from the inner volume of the case 56 after injection, during its movement from its first to its second position.

The upper wall 57 is substantially parallel to the free surface 5. The core 9 and the second stiffening element 19 are directly connected to the upper wall 57. The first stiffening element 17, however, is directly connected to the free surface 5. The thinner material line 41 extends from the junction between the first stiffening element 17 of the free surface 5 and the junction between the side walls 59 of the free surface 5.

Figure 3:
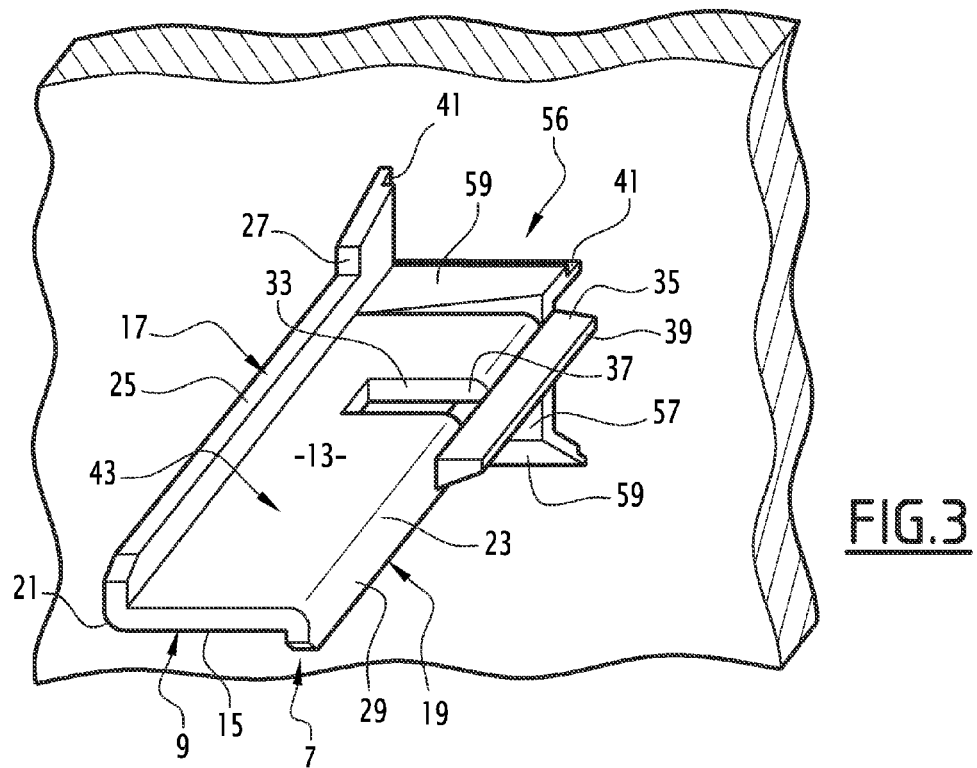
FIGS. 3 and 4 are views similar to those of FIG. 1, for alternative embodiments of the molded part.

As shown in FIG. 3, the second stiffening element 19 does not comprise a taller end portion 31. It has the same first height over its entire longitudinal length.

Such an arrangement has the advantage of longitudinally shortening the core 9, such that its stiffness is increased.

Figure 4:
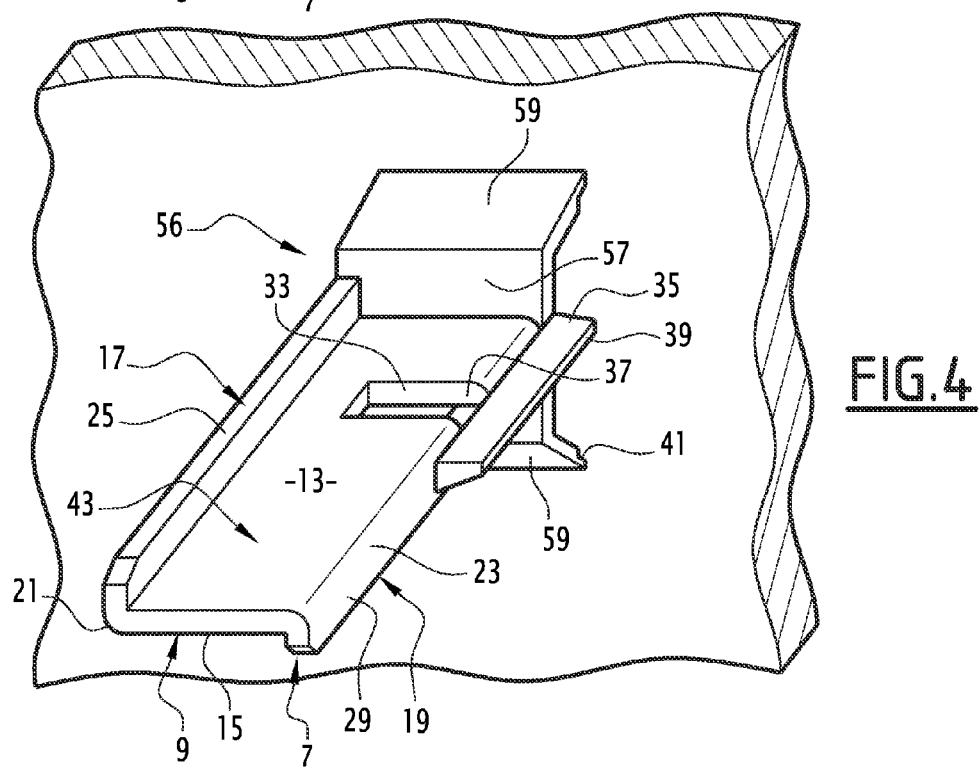

A second alternative of the molded part will now be outlined in reference to FIG. 4. Only the differences between this alternative and FIG. 3 will be outlined below. Elements that are identical or perform the same functions in both alternative embodiments will be designated using the same references.

In the alternative embodiment of FIG. 4, the first stiffening element 17 is no longer directly connected to the free surface 5. On the contrary, it is directly connected to the upper wall 57 of the case.

In the illustrated example, the first and second stiffening elements 17 and 19 do not comprise a taller end portion 27, 31. Thus, the first and second stiffening elements 17, 19 have the same first height over their entire longitudinal length.

The arrangement of FIG. 4 has the advantage of longitudinally shortening the core 9, its stiffness thus being increased.

According to another alternative embodiment, not shown, the clip holder 7 comprises a web extending the core 9 transversely past the first stiffening element 17 and/or past the second stiffening element 19.

The invention claimed is:

1. A molded vehicle part, comprising a main portion having a free surface and at least one clip holder protruding longitudinally from the free surface, the clip holder comprising:
a core designed to receive the clip, the core extending in a substantially longitudinal and transverse plane and having first and second large faces opposite one another, the core being transversely delimited by first and second lateral edges;
wherein the core has:
a single first stiffening element, protruding only from its first large face; and
a single second stiffening element, protruding only from its second large face;
wherein the first stiffening element and the second stiffening element extend along the first lateral edge and the second lateral edge, respectively.

2. The part according to claim 1, wherein the first stiffening element and the second stiffening element extend in parallel planes separate from one another.

3. The part according to claim 1, wherein the core has at least one window.

4. The part according to claim 3, wherein the window opens at the second lateral edge.

5. The part according to claim 3, wherein the clip holder comprises a rib along the second lateral edge, extending at least along the window.

6. The part according to claim 1, wherein the clip holder comprises at least one case with an upper wall and a plurality of side walls connecting the upper wall to the free surface, at least the core being directly connected to the upper wall.

7. The part according to claim 1, wherein the clip holder comprises at least one case with an upper wall and a plurality of side walls connecting the upper wall to the free surface, the core, the first stiffening element and the second stiffening element being directly connected to the upper wall.

8. The part according to claim 1, wherein the core, the first stiffening element and the second stiffening element are directly connected to the free surface.

9. An assembly comprising a part according to claim 1, and at least one elastic clip mounted on the core.

10. The assembly according to claim 9, wherein the elastic clip comprises a portion arranged to snap into a complementary member supported by another part of the motor vehicle.

11. The assembly according to claim 10, wherein the clip is independent of the other part.

12. The assembly according to claim 9, wherein the clip is a bent metal part or is made from molded plastic.

13. The assembly according to claim 9, wherein the clip pinches a zone of the core furthest from the free surface.

14. The assembly according to claim 9, wherein the clip is a flexible blade, comprising a connecting part pinching the core of the clip holder and a part designed to snap into a complementary member supported by another part of the motor vehicle.

15. A method for manufacturing a molded part according to claim 1, the method comprising the following steps:
obtaining a mold having a cavity and a single drawer movable relative to the cavity;
inserting plastic material into the mold, the drawer being in a first position; and
moving the drawer relative to the cavity into a second position, in a direction forming an angle smaller than 15° relative to the transverse direction.

* * * * *